United States Patent
Chou et al.

(10) Patent No.: US 9,045,177 B2
(45) Date of Patent: Jun. 2, 2015

(54) OMNI-DIRECTIONAL TERRAIN CROSSING MECHANISM

(71) Applicant: National Taiwan University, Taipei (TW)

(72) Inventors: Jui-Jen Chou, Taipei (TW); Li-Shing Yang, Taipei (TW); Cheng-Tse Yang, Taipei (TW)

(73) Assignee: National Taiwan University, Taipei (TW)

(*) Notice: Subject to any disclaimer, the term of this patent is extended or adjusted under 35 U.S.C. 154(b) by 164 days.

(21) Appl. No.: 13/778,509

(22) Filed: Feb. 27, 2013

(65) Prior Publication Data

US 2014/0238755 A1    Aug. 28, 2014

(51) Int. Cl.
| | |
|---|---|
| *B62D 57/00* | (2006.01) |
| *B62D 57/02* | (2006.01) |
| *B60F 3/00* | (2006.01) |

(52) U.S. Cl.
CPC ............... *B62D 57/022* (2013.01); *B60F 3/00* (2013.01)

(58) Field of Classification Search
CPC .................................................. B62D 57/022
USPC ............................................ 180/8.1, 8.2, 8.3
See application file for complete search history.

(56) References Cited

U.S. PATENT DOCUMENTS

| | | | | |
|---|---|---|---|---|
| 3,179,431 | A | * | 4/1965 | Pikl .................................. 280/5.2 |
| 3,499,501 | A | * | 3/1970 | Bauer et al. ..................... 180/8.2 |
| 3,895,596 | A | * | 7/1975 | Amour ........................ 440/12.66 |
| 3,995,909 | A | * | 12/1976 | van der Lely ..................... 301/47 |
| 4,906,051 | A | * | 3/1990 | Vilhauer, Jr. .................. 301/38.1 |
| 5,267,888 | A | * | 12/1993 | Hippely et al. ................ 446/465 |
| 5,765,497 | A | * | 6/1998 | Thomas et al. ............... 440/12.5 |
| 6,502,657 | B2 | * | 1/2003 | Kerrebrock et al. ........... 180/218 |
| 6,860,346 | B2 | * | 3/2005 | Burt et al. ........................ 180/8.2 |
| 7,017,687 | B1 | * | 3/2006 | Jacobsen et al. ............... 180/8.3 |
| 7,249,640 | B2 | * | 7/2007 | Horchler et al. ............... 180/8.6 |
| 7,543,663 | B2 | * | 6/2009 | Setrakian et al. .............. 180/8.1 |
| 7,588,105 | B2 | * | 9/2009 | Hillis et al. ..................... 180/7.1 |
| 7,753,145 | B2 | * | 7/2010 | Hillis et al. ..................... 180/8.1 |
| 7,794,300 | B2 | * | 9/2010 | Moll et al. ...................... 446/164 |
| 7,836,983 | B2 | * | 11/2010 | Setrakian et al. .............. 180/8.3 |
| 7,971,664 | B2 | * | 7/2011 | Skaff ............................... 180/8.1 |
| 8,002,596 | B2 | * | 8/2011 | Wernicke et al. ........... 440/12.63 |
| 8,104,553 | B2 | * | 1/2012 | Setrakian et al. .............. 180/8.1 |
| 8,197,298 | B2 | * | 6/2012 | Willett ............................ 446/164 |
| 8,307,923 | B2 | * | 11/2012 | Lin et al. ......................... 180/8.3 |

(Continued)

*Primary Examiner* — Joseph Rocca
*Assistant Examiner* — Conan Duda
(74) *Attorney, Agent, or Firm* — Mintz Levin Cohn Ferris Glovsky and Popeo, P.C.; Peter F. Corless; Steven M. Jensen

(57) ABSTRACT

The present disclosure provides an omni-directional terrain crossing mechanism, including a transformable mechanism with a plurality of claw wheels, in order to be capable of fast moving on the flat ground or in uneven terrain environments. The omni-directional terrain crossing mechanism includes a first body and a second body. Each of the first body and the second body includes at least one pair of claw wheels. Moreover, the omni-directional terrain crossing mechanism is capable of transforming one pair of first claw wheels of the first body and one pair of second claw wheels of the second body into a pair of complete wheels. Consequently, as compared with the existing mobile machines, the omni-directional terrain crossing mechanism in the present disclosure is capable of moving in various challenging terrain environments.

7 Claims, 7 Drawing Sheets

(56) References Cited

U.S. PATENT DOCUMENTS

| | | |
|---|---|---|
| 8,720,614 B2 * | 5/2014 | Nesnas et al. .................. 180/7.5 |
| 8,753,155 B2 * | 6/2014 | Olm et al. .................. 440/12.66 |
| 2013/0081885 A1 * | 4/2013 | Connor .......................... 180/8.2 |
| 2014/0158439 A1 * | 6/2014 | Kim et al. ...................... 180/8.2 |

* cited by examiner

OMNI-DIRECTIONAL TERRAIN CROSSING MECHANISM

BACKGROUND OF THE INVENTION

1. Field of the Invention

The present disclosure relates to terrain crossing mechanisms, and more specifically, to an omni-directional terrain crossing mechanism.

2. Description of Related Art

In recent years, there are more and more studies of mobile robots due to the needs of searching, rescuing, scouting and so forth. Some types of mobile robots (such as wheel, leg, claw, caterpillar, snake-liked and hybrid types of robots) have been developed in order to be adapted to different terrain environments.

However, most of the current mobile robots are not widely applicable to various challenging terrain environments, and have high consumption of energy.

For example, as shown in FIG. 1, a legged robot 9 including a plurality of legs 91 is adaptable to various terrain environments. However, the design of the legged robot 9 is complicated, and high power and torque are required. Besides, the legged robot 9 is very likely to slip or fall, as compared with other types of robots.

A wheeled robot may be more easily designed, as compared to the legged robot. The wheeled robot has high moving efficiency when moving on the flat ground. Nevertheless, it is less adaptable to uneven terrain or stairways.

In addition, a hybrid robot with the advantages of the legged robot and the wheeled robot has been widely studied in recent years. The hybrid robot may be categorized into four types: (a) a robot with a wheel attached to the end of each leg; (b) a robot with wheels and legs installed separately; (c) a robot with a rimless wheel mechanism acting as a leg; and (d) a hybrid robot with wheels transformable into legs.

The aforesaid hybrid robot has different modes, and may switch between different modes based on different circumstances. However, the hybrid robot requires quite a number of actuators. In other words, the hybrid robot is considerably complicated in terms of design, construction, control and maintenance. The cost of the hybrid robot may be substantially higher, as compared to the legged robot and the wheeled robot.

Hence, there is a need to design an automatic machine capable of moving in terrain environments in terms of cost effectiveness, uncomplicated design, versatility, accuracy and sensitiveness.

SUMMARY

The present disclosure provides an omni-directional terrain crossing mechanism, thereby effectively reducing the cost and weight, and also overcoming the drawbacks of the current mobile machines that is not capable of moving on a stairway or in uneven terrain environments.

The omni-directional terrain crossing mechanism of the present disclosure includes a first body having at least one pair of first claw wheels and a plurality of support members; and a second body coupled to the first body via a folding motor and having at least one pair of second claw wheels, wherein the at least one pair of first claw wheels and the at least one pair of second claw wheels are transformed into a pair of complete wheels by the folding motor.

Moreover, the omni-directional terrain crossing mechanism of the present disclosure also includes a wheel space between two of the plurality of support members for accommodating one of the first claw wheels and one of the second claw wheels when transforming the first claw wheels and the second claw wheels into a pair of complete wheels; and at least one auxiliary wheel installed between the first body and the second body.

In addition, a first claw wheel includes a first strengthen axle and a first claw, and a second claw wheel includes a second strengthen axle and a second claw. The first claw wheel and the second claw wheel are formed as an S-shaped claw wheel or an I-shaped claw wheel, and one of the first claw wheel and the second claw wheel is rotated by 90°.

Furthermore, the omni-directional terrain crossing mechanism of the present disclosure includes a floating member installed in at least one of the first body and the second body; a telescopic member installed in at least one of the first body and the second body; a plurality of driving motors driving the at least one pair of first claw wheels and the at least one pair of second claw wheels; a microprocessor electrically connected to the folding motor and the plurality of driving motors; and an alignment member aligning one of the pair of first claw wheels and one of the pair of the second claw wheels to form a complete wheel.

In certain embodiments of the present disclosure, there are other components in addition to or in place of those mentioned above. The components will become apparent to those skilled in the art from a reading of the following detailed description when taken with reference to the accompanying drawings.

BRIEF DESCRIPTION OF DRAWINGS

The present disclosure can be more fully understood by reading the following detailed description of the preferred embodiments, with reference made to the accompanying drawings, wherein.

DETAILED DESCRIPTION

Figure 1:
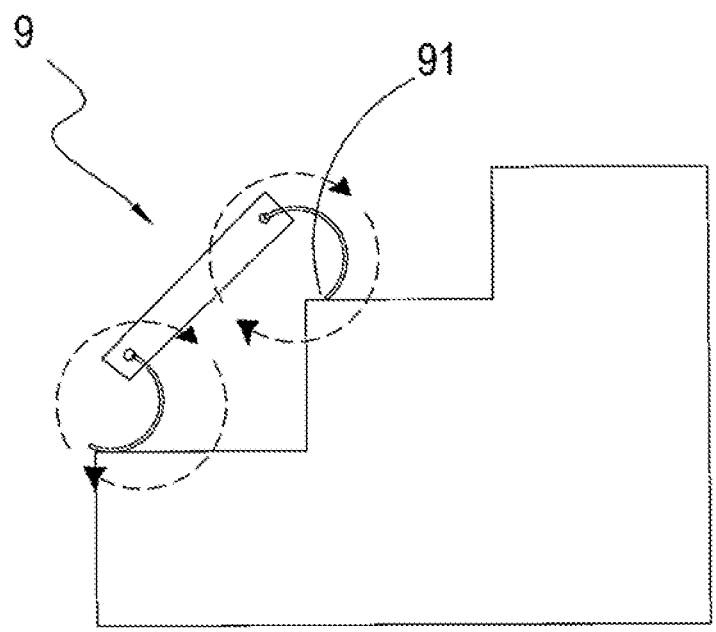
FIG. 1 is a schematic diagram depicting a conventional mobile robot.

The following embodiments are described in sufficient detail to enable those skilled in the art to make and use the present disclosure. It is to be understood that other embodiments would be evident based on the present disclosure, and that system or mechanical changes may be made without departing from the scope of the present disclosure.

In the following description, numerous specific details are given to provide a thorough understanding of the present disclosure. However, it will be apparent that the present disclosure may be practiced without these specific details. In order to avoid obscuring the present disclosure, some well-known mechanisms and system configurations are not disclosed in detail.

The drawings showing embodiments of the mechanism are semi-diagrammatic and not to scale and, particularly, some of the dimensions are for the clarity of presentation and are shown exaggerated in the drawings. Similarly, although the views in the drawings for ease of description generally show similar orientations, this depiction in the drawings is arbitrary for the most part. Generally, the present disclosure can be operated in any orientation.

Figure 2:
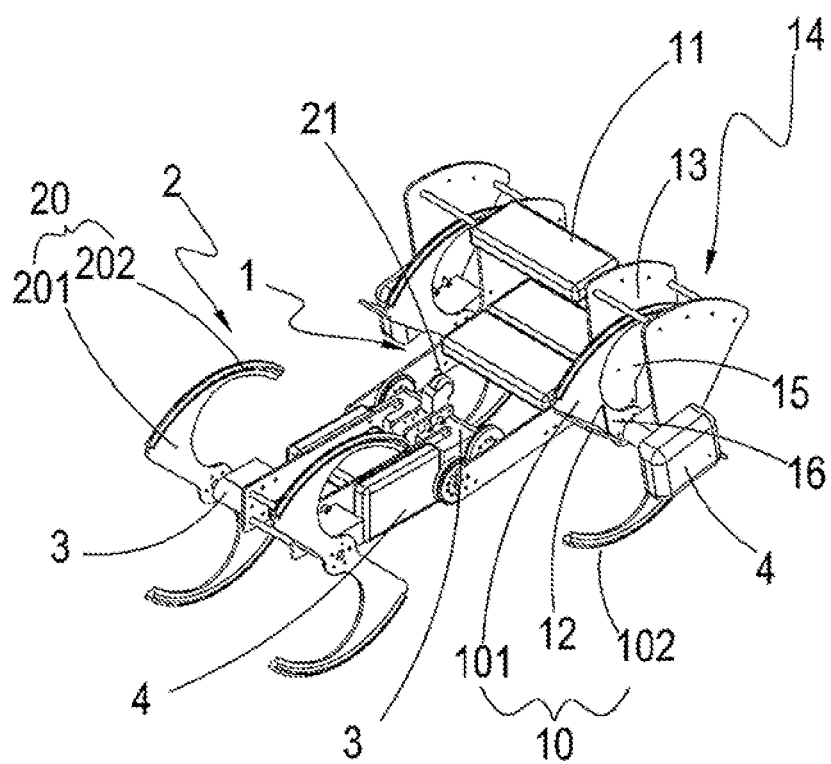
FIG. 2 is a three-dimensional view illustrating an omni-directional terrain crossing mechanism including a claw-wheel transformable mechanism according to an embodiment of the present disclosure.

The present disclosure provides an omni-directional terrain crossing mechanism, including a first body 1 and a second body 2, as shown in FIG. 2. The first body 1 includes at least one pair of first claw wheels 10 and a plurality of support members 13. The second body 2 includes at least one pair of second claw wheels 20, and is coupled to the first body 1 via a folding motor 3.

In an embodiment of the present disclosure, the first claw wheels 10 of the first body 1 and the second claw wheels 20 of the second body 2 are transformed into a pair of complete wheels by the folding motor 3. Accordingly, the omni-directional terrain crossing mechanism is capable of fast moving on the flat ground.

Figure 3:
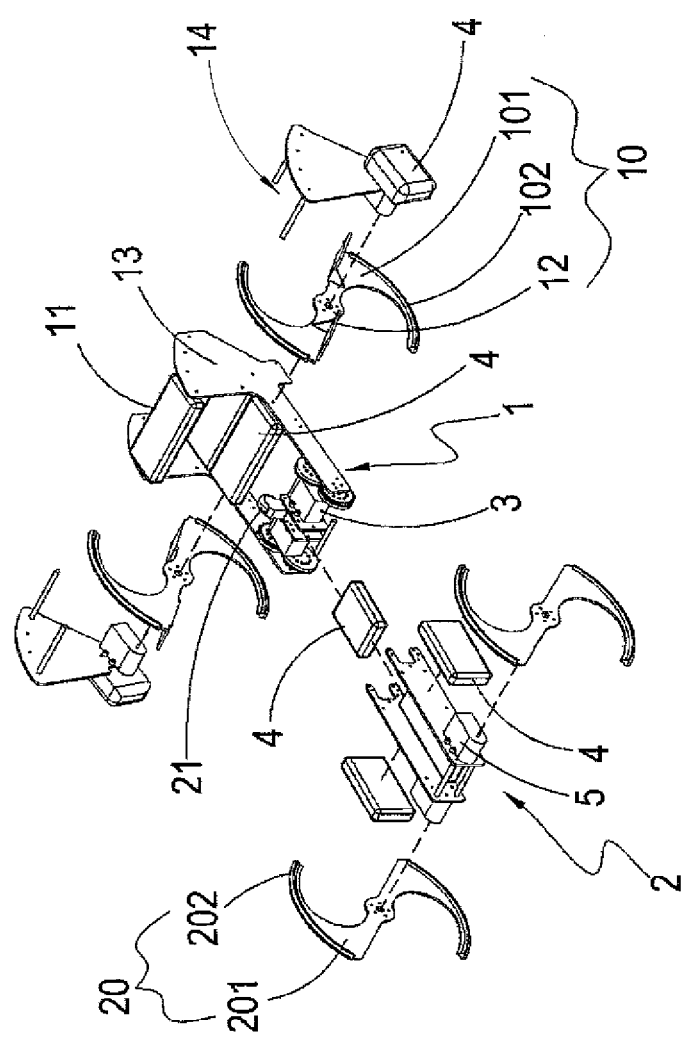
FIG. 3 is a schematic perspective view illustrating an omni-directional terrain crossing mechanism according to an embodiment of the present disclosure.

Referring to FIG. 3, a schematic perspective view of an omni-directional terrain crossing mechanism is shown according to an embodiment of the present disclosure.

Figure 4:
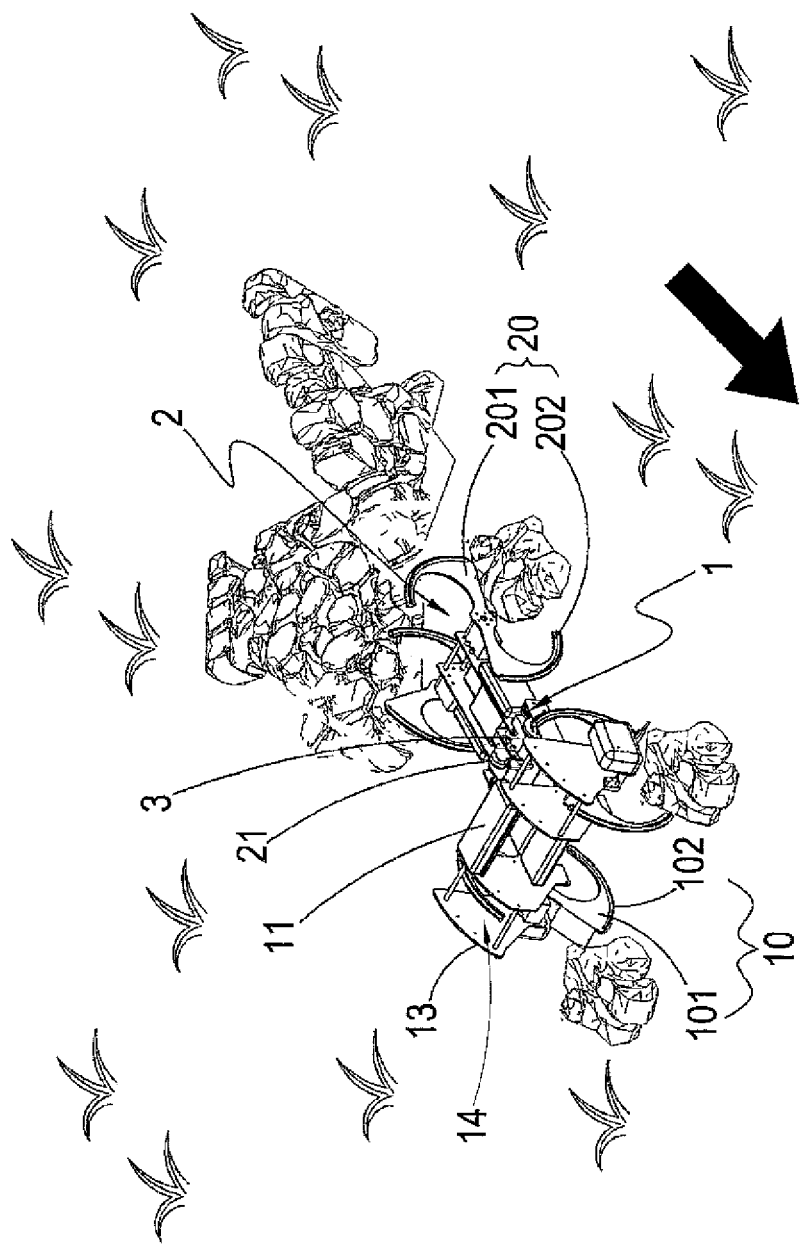
FIG. 4 is a schematic diagram illustrating an omni-directional terrain crossing mechanism capable of moving in a rugged terrain environment according to an embodiment of the present disclosure.

As shown in FIG. 4, the omni-directional terrain crossing mechanism having the at least one pair of first claw wheels 10 of the first body 1 and the at least one pair of second claw wheels 20 of the second body 2 may also be used in stair climbing or challenging terrain environments. In other words, the omni-directional terrain crossing mechanism is capable of climbing up/down stairs due to design of the at least one pair of first claw wheels 10 of the first body 1 and the at least one pair of second claw wheels 20 of the second body 2, and thus overcomes the problem of conventional mobile machines being incapable of moving in uneven terrain environments.

According to an embodiment of the present disclosure, the omni-directional terrain crossing mechanism also includes at least two wheel spaces 14, each between two of the support members 13. The wheel spaces 14 accommodates a first claw wheel 10 of the first body 1 and a second 25 claw wheel 20 of the second body 2 when transforming the pair of first claw wheels 10 of the first body 1 and the pair of second claw wheels 20 of the second body 2 into a pair of complete wheels (a pair of complete circles).

Figure 5:
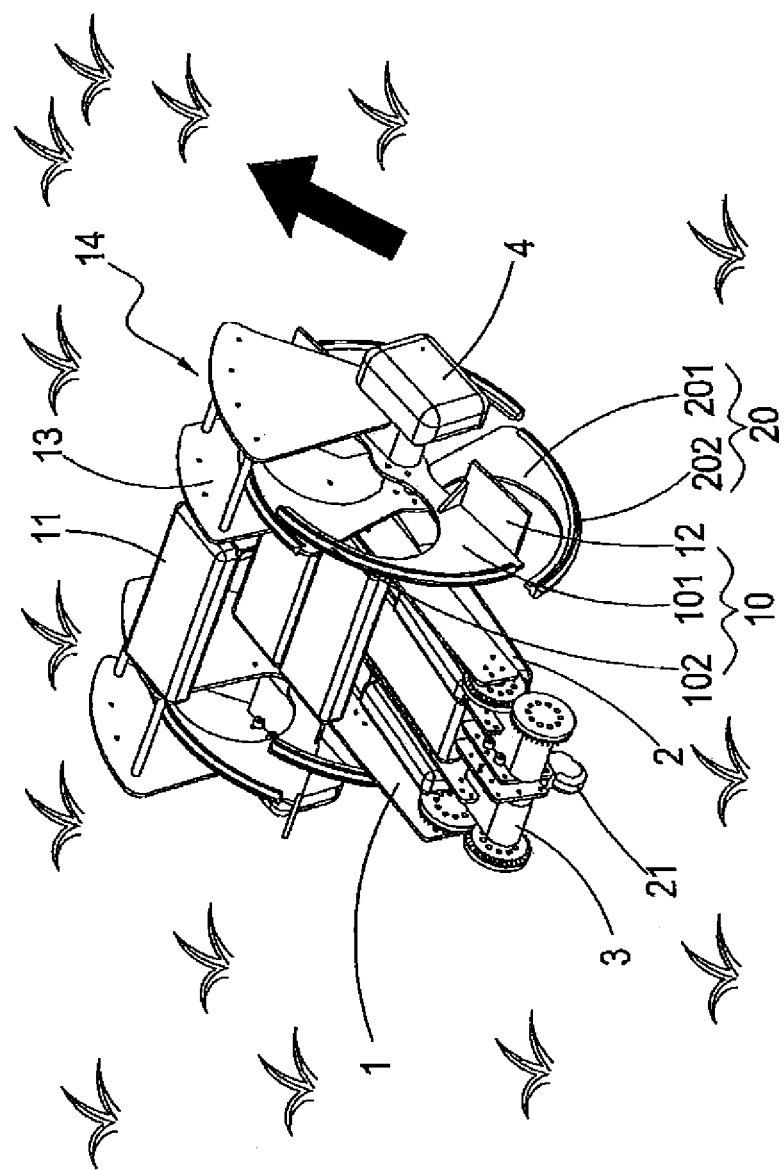
FIG. 5 is a schematic diagram illustrating an omni-directional terrain crossing mechanism capable of moving in a flat terrain environment according to another embodiment of the present disclosure.

Consequently, one of the first claw wheel 10 and the second claw wheel 20 may be rotated by 90° such that each of the pair of complete wheels may be formed by the first claw wheel 10 and the second claw wheel 20. In other words, the pair of complete wheels are formed by the pair of first claw wheels 10 of the first body 1 and the pair of second claw wheels 20 of the second body 2. Therefore, according to another embodiment of the present disclosure, the omni-directional terrain crossing mechanism is also capable of fast movement in a flat terrain environment, as shown in FIG. 5. Besides, the omni-directional terrain crossing mechanism of the present disclosure includes an alignment member 12 for aligning the first claw wheel 10 and the second claw wheel 20 in order to form a complete wheel.

According to an embodiment of the present disclosure, the omni-directional terrain crossing mechanism further includes at least one auxiliary wheel 21. The auxiliary wheel 21 is installed in one of the first body 1 and the second body 2 and between the first body 1 and the second body 2.

In an example of the present disclosure, the auxiliary wheel 21 may be a wheel or a ball caster. Accordingly, the pair of complete wheels and the auxiliary wheel 21 are provided for the omni-directional terrain crossing mechanism to move forward/backward on the flat ground quickly and efficiently. As a result, the terrain crossing mechanism of the present disclosure can be easily controlled, and can be operated much more efficiently.

Moreover, according to an embodiment of the present disclosure, a first claw wheel 10 includes a first strengthen axle 101 (or alternatively referred to as a "first strengthening spoke") and a first claw 102, and a second claw wheel 20 includes a second strengthen axle 201 (or alternatively referred to as a "second strengthening spoke") and a second claw 202. The first claw wheel 10 and the second claw wheel 20 are formed as an S-shaped claw wheel or an I-shaped claw wheel. The rim of each claw of the first claw wheel 10 and the second claw wheel 20 is about a ¼ circle.

In addition, the first claw wheel 10 and the second claw wheel 20 may rotate clockwise while climbing stairs, and may rotate counterclockwise while going down stairs. Accordingly, the design of the claw wheel 10 and the second claw wheel 20 is able to adapt to various heights of stairways.

In an example of the present disclosure, one of the first claw wheel 10 and the second claw 20 wheel may be rotated by 90° such that a complete wheel may be formed by the first claw wheel 10 and the second claw wheel 20.

Figure 6:
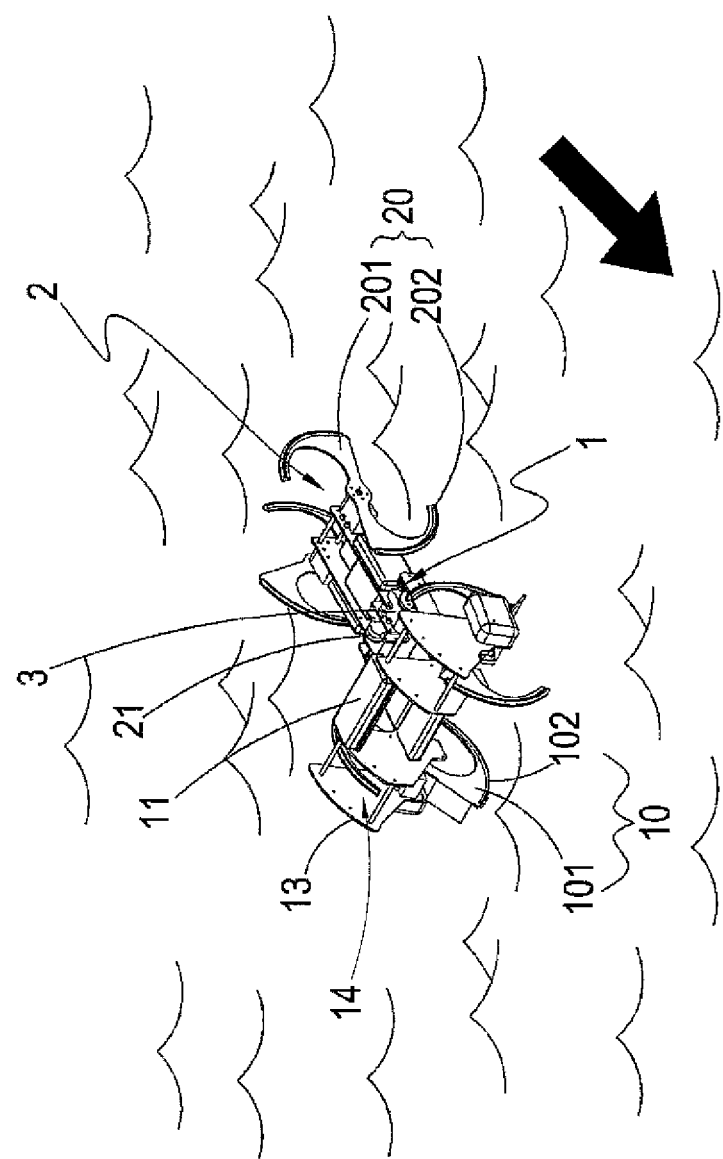
FIG. 6 is a schematic diagram illustrating an omni-directional terrain crossing mechanism capable of moving in the water according to another embodiment of the present disclosure.

In another embodiment of the present disclosure, the omni-directional terrain crossing mechanism further includes a floating member 4, as shown in FIG. 6. The floating member 4 is installed in at least one of the first body 1 and the second body 2. Thus, according the embodiment of the present disclosure, the omni-directional terrain crossing mechanism having the floating member 4 is capable of moving in the water, as shown in FIG. 6.

Figure 7:
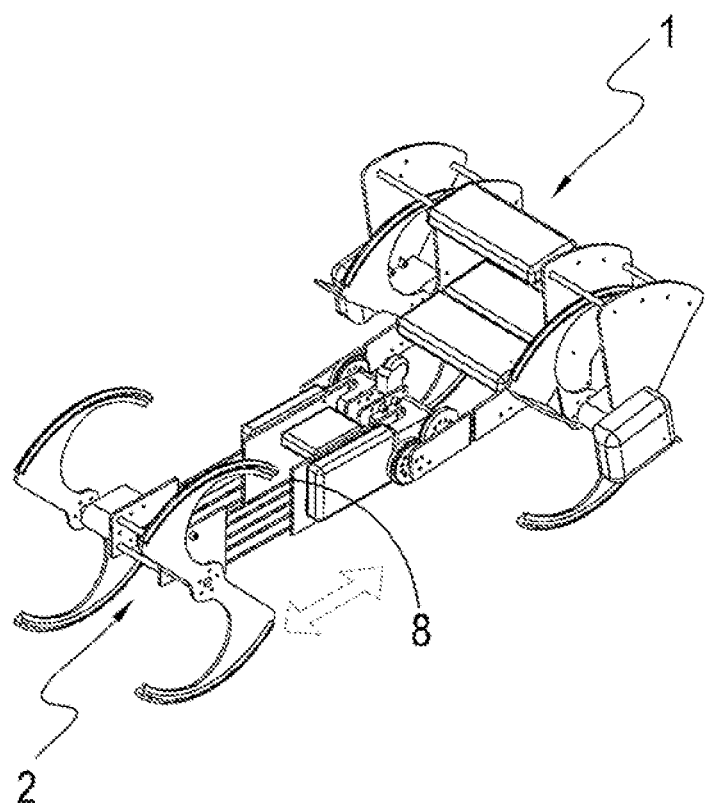
FIG. 7 is a three-dimensional view illustrating an omni-directional terrain crossing mechanism according to another embodiment of the present disclosure.

Additionally, referring now to FIG. 7, a telescopic member 8 is installed in at least one of the first body 1 and the second body 2 and between the first body 1 and the second body 2. The telescopic member 8 extends the length of the omni-directional terrain crossing mechanism, and thus the omni-directional terrain crossing mechanism is capable of moving in specific challenging terrain environments.

Furthermore, the omni-directional terrain crossing mechanism further includes a plurality of driving motors 5 (shown in FIG. 3). The driving motors 5 drive the first claw wheels 10 of the first body 1 and the second claw wheels 20 of the second body 2.

In addition, the omni-directional terrain crossing mechanism includes a remote controller and a control platform. The remote controller includes a computer and a communication module (not shown). Moreover, the control platform includes a microprocessor 11 (such as a central processing unit (CPU)), actuators, sensors and power modules. According to an embodiment of the present disclosure, a CPU (not shown) is electrically connected to the folding motor 3 and the driving motors 5.

Regarding the communication module, in an example of the present disclosure, a ZigBee wireless communication module (Zig-110) is used for wireless communication between a computer and the mechanism of the present disclosure. As such, the status of the folding motor 3 and the driving motors 5 may be displayed on a graphical user interface programmed with the GUI design environment (GUIDE) tool in MATLAB.

The resulting terrain crossing mechanism in the present disclosure is straightforward, cost-effective, uncomplicated, highly versatile, accurate, sensitive and effective, and can be implemented by adapting known components for efficient and economical manufacturing, application and utilization.

While the invention has been described in conjunction with a specific mode, it is to be understood that many alternatives, modifications, and variations will be apparent to those skilled in the art in light of the aforesaid description. Accordingly, it is intended to embrace all such alternatives, modifications, and variations that fall within the scope of the included claims. All matters heretofore set forth herein or shown in the accompanying drawings are to be interpreted in an illustrative and non-limiting sense.

What is claimed is:

1. An omni-directional terrain crossing mechanism, comprising:
   a first body having at least one pair of first claw wheels and a plurality of support members;
   a second body coupled to the first body via a folding motor, the folding motor facilitating folding of the first and second bodies relative to one another, and having at least one pair of second claw wheels;
   a first wheel space and a second wheel space, each separately disposed between two of the plurality of support members of the first body and having one of the first claw wheels disposed therein; and
   wherein each of the claw wheels further comprises a strengthening spoke as well as a first rim disposed on one end of the spoke and a second rim disposed on the other end of the spoke opposite the first rim, each of the rims having the shape of a quarter circle,
   wherein the first claw wheels of the first body combine with the second claw wheels of the second body and are transformed into a pair of complete wheels when the folding motor folds the first and second bodies relative to one another, such that the first and second wheel spaces each accommodate one of the first claw wheels and one of the second claw wheels with the strengthening spokes of the first claw wheels being adjacent and perpendicular to the strengthening spoke of the second claw wheels combined therewith.

2. The omni-directional terrain crossing mechanism as claimed in claim 1, further comprising at least one auxiliary wheel installed in the first body or the second body.

3. The omni-directional terrain crossing mechanism as claimed in claim 1, wherein the one of the first claw wheels comprises the first strengthening spoke and a first claw to form an S-shaped claw wheel or an I-shaped claw wheel, and the one of the second claw wheels comprises the second strengthening spoke strengthen axle and a second claw to form an S-shaped claw wheel or an I-shaped claw wheel.

4. The omni-directional terrain crossing mechanism as claimed in claim 1, further comprising a floating member installed in at least one of the first body and the second body.

5. The omni-directional terrain crossing mechanism as claimed in claim 1, further comprising a telescopic member installed in at least one of the first body and the second body.

6. The omni-directional terrain crossing mechanism as claimed in claim 1, further comprising a plurality of driving motors driving the at least one pair of first claw wheels and the at least one pair of second claw wheels.

7. The omni-directional terrain crossing mechanism as claimed in claim 1, further comprising an alignment member aligning one of the first claw wheels and one of the second claw wheels to form a complete wheel.

* * * * *